O. SMITH.
BRAKE MECHANISM.
APPLICATION FILED MAR. 28, 1916.

1,330,500.

Patented Feb. 10, 1920.

Inventor
Oberlin Smith
by Chas. F. Williamson
Attorney

UNITED STATES PATENT OFFICE.

OBERLIN SMITH, OF BRIDGETON, NEW JERSEY.

BRAKE MECHANISM.

1,330,500. Specification of Letters Patent. Patented Feb. 10, 1920.

Original application filed December 14, 1911, Serial No. 665,799. Divided and this application filed March 28, 1916. Serial No. 87,292.

*To all whom it may concern:*

Be it known that I, OBERLIN SMITH, a citizen of the United States, and resident of Bridgeton, in the county of Cumberland, and in the State of New Jersey, have invented a certain new and useful Improvement in Brake Mechanism, and do hereby declare that the following is a full, clear, and exact description thereof.

Among other objects I have had in view in the production of this invention are such a construction of the mechanism as will make it so self-contained as to enable it to be manufactured without special reference to any particular position it is to occupy, so that it may be readily applied to a power press, or any other machine requiring a clutch and brake as a part of its organization, and in any position on the machine which may be required in view of the location of the shaft whose revolution is to be controlled and, such a mode of mounting or support thereof, as will assure readily and certainly the concentricity of those members that must be concentric. With these and other objects hereinafter set forth, in view, my invention consists in the mechanism constructed substantially as hereinafter specified and claimed.

In the accompanying drawings—

To illustrate an embodiment of my invention, I have selected an instance of its application in which a constantly running band wheel 10 is to be clutched and unclutched from a shaft 11 having a pinion 12 by which power is to be transmitted to the desired machinery, the pinion being preferably, but not necessarily formed by gear teeth cut in an enlargement of the shaft. The clutch shaft 11 is journaled in two boxes carried by a bracket 13, that is provided with bolt holes for its attachment to the press or machine frame; as all parts of the clutch and brake mechanism are carried by this bracket, the structure is thus a self-contained one, or a unit, and, therefore, can be carried in stock for use on various machines without change.

Figure 1:
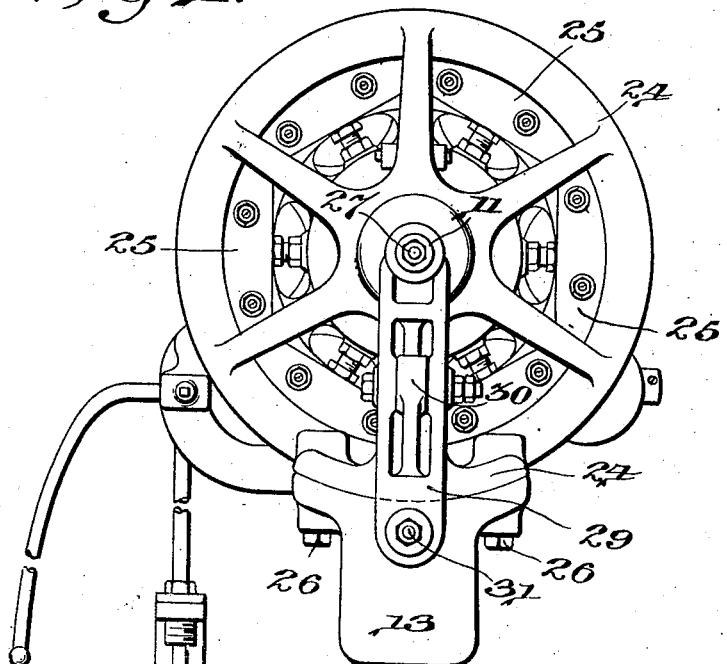
Figure 1 is an end elevation of a clutch and brake embodying my invention.
Figure 2:
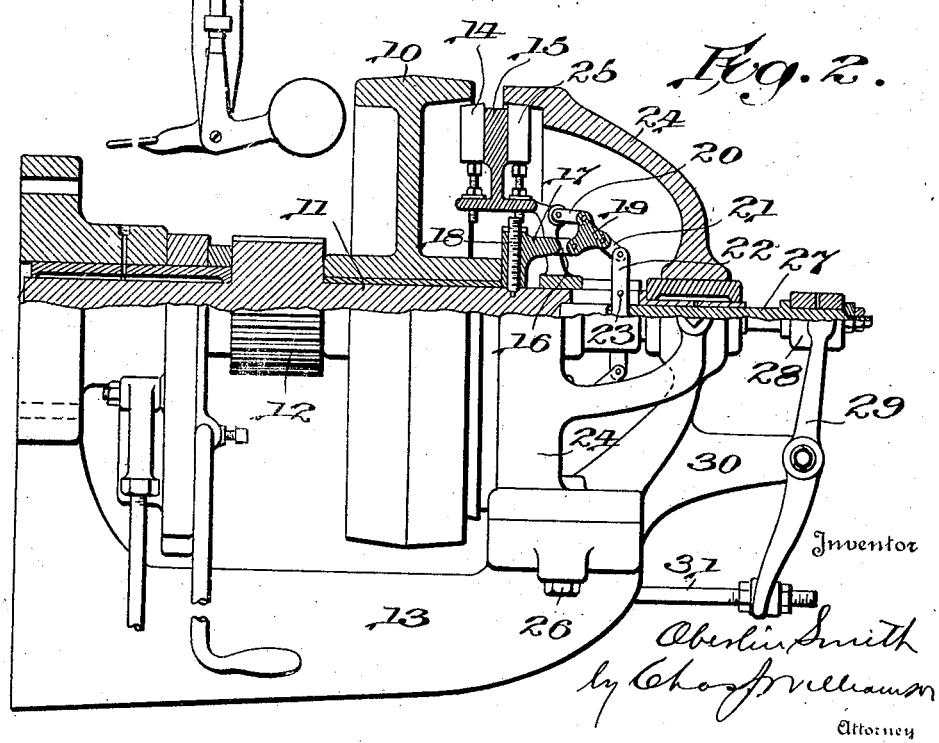
Fig. 2 is a side view of the same, partly in longitudinal section.

The wheel 10 is journaled on the shaft 11 so as to turn freely thereon, and as illustrated in Fig. 2, it has the internal circumference of its rim coned to be engaged by the coned periphery of wooden friction blocks 14, secured to a spider 15 which has a hub by which the spider is mounted upon the shaft 11, the spider having, as is usual, an axial movement to carry its blocks or shoes into and out of frictional contact with the rim of the wheel 10. Pivoted to ears 16, on a collar 17, which is secured to the clutch shaft by screws 18, are two bell-crank toggle levers 19, one arm of each of which is connected by links 20 to the clutch spider and another arm of which is connected by links 21, to the end of a bar 22, forming a toggle beam that passes diametrically through coinciding slots in the clutch shaft and the spider hub. Besides being the means to rock the toggle levers, as presently explained, the bar or beam 22, connects the spider and shaft so that they can not independently rotate. The bar or beam 22, is restrained from endwise movement, as well as guided in its movement axially of the clutch shaft, by pins or projections 23, that bear upon diametrically opposite flat surfaces on the shaft. When the toggle beam or bar 22, is moved to rock the toggle levers to set the clutch, the beam and the opposite links connected therewith will be brought into alinement, and thus the clutch be locked in its set position, and, of course, the clutching pressure increases as said parts move into alinement.

The bracket 13, carries a brake member in the form of a brake-spider 24, having like the fly wheel 10, a conical surface for engagement by wooden blocks or shoes, 25, carried by the clutch spider on the side opposite that having the clutch shoes so that alternately the clutch and brake are applied, to revolve and stop the clutch shaft, respectively. The brake spider is made separately from the bracket 13, but it is bolted thereto, so as in effect to be a part thereof, and to secure perfect alinement of the brake spider, its surface and the seat on the bracket engaged by it, are cylindrically curved on an arc concentric with the clutch shaft axis. Were the engaging surfaces of brake spider and bracket flat it will be seen that the spider could occupy but one position where it would be concentric with the shaft axis and, therefore, very nice adjustment would be necessary to secure such concentricity and a shift in the position of the spider sidewise in either direction would destroy such concentricity. Obviously, no nice or close adjustment is necessary when the engaging surfaces of spider and bracket are concentric with the shaft axis, because it is impossible by any sidewise displacement of the spider to destroy the concentricity of spider and axis. Moreover, the curved contacting surfaces of spider and bracket 13 assure against nonalinement of spider axis and shaft axis by any vertical tilting of the spider, such as could occur with flat or plane surfaces. The spider and bracket 13 are secured together by vertical bolts 26.

The clutch shaft 11 is bored axially from its outer end inward to a point slightly beyond the toggle beam or bar, 22, and passing through the channel, thus formed, is a rod 27 which at its inner end is attached to said beam, and is the means by which motion is imparted to said beam to actuate the clutch and brake shoes. At its outer end the rod 27 has a collar 28, which is engaged by one end of a lever 29, pivoted to an arm 30 on the brake spider, while at its other end it has a ball and socket connection with one end of a rod 31, whose other end is connected to suitable treadle, or lever operating means not necessary to be described.

It will be seen that the complete organization, including the clutch and the brake (with the exception of simple treadle connections) is mounted upon the bracket 13, so that all that is necessary for the equipment of a press or other machine with its power-controlling mechanism, is to secure the bracket to the machine framework in the position required for the delivery of power from the shaft 11 to the main shaft of the machine, duly connecting it with a treadle if desired.

This application is a division of my application Serial Number 665,799, allowed February 19, 1916.

Having thus described my invention what I claim is—

The combination of a bracket, a shaft supported wholly by the bracket, a wheel loose on the shaft, a brake member alongside the wheel, having a cylindrically curved face engaging a correspondingly curved surface on the bracket, the axis of the curve being concentric with the shaft axis, a friction member connected with the shaft and movably mounted between wheel and brake member, having on one side a clutch element, and on the opposite side a brake element, and means to move said friction member along the shaft.

In testimony that I claim the foregoing I have hereunto set my hand.

OBERLIN SMITH.